(12) United States Patent
Etheridge

(10) Patent No.: US 9,049,027 B2
(45) Date of Patent: Jun. 2, 2015

(54) NON-PKI DIGITAL SIGNATURES AND INFORMATION NOTARY PUBLIC IN THE CLOUD

(75) Inventor: Young H. Etheridge, Oak Ridge, TN (US)

(73) Assignee: ZENERJI LLC, Naples, FL (US)

( * ) Notice: Subject to any disclaimer, the term of this patent is extended or adjusted under 35 U.S.C. 154(b) by 309 days.

(21) Appl. No.: 13/474,412

(22) Filed: May 17, 2012

(65) Prior Publication Data

US 2013/0311772 A1 Nov. 21, 2013

(51) Int. Cl.
*H04L 29/06* (2006.01)
*H04L 9/32* (2006.01)

(52) U.S. Cl.
CPC ............ *H04L 9/3247* (2013.01); *H04L 9/3263* (2013.01); *H04L 63/0823* (2013.01); *H04L 63/126* (2013.01)

(58) Field of Classification Search
CPC ... H04L 9/3247; H04L 9/0825; H04L 9/3249; H04L 9/3255; H04L 9/3281; H04L 9/3263; H04L 63/125; H04L 63/0823; H04L 9/3257; G06F 21/64
USPC .................................. 713/156, 176–178, 180
See application file for complete search history.

(56) References Cited

U.S. PATENT DOCUMENTS

| 8,549,303 | B2 * | 10/2013 | Fifield et al. .................. 713/176 |
| 2002/0032856 | A1 * | 3/2002 | Noguchi et al. .............. 713/156 |
| 2008/0098230 | A1 * | 4/2008 | Kalibjian et al. ............. 713/176 |
| 2010/0217996 | A1 * | 8/2010 | Ross et al. ..................... 713/179 |
| 2012/0011359 | A1 | 1/2012 | Etheridge |

OTHER PUBLICATIONS

National Institute of Standards and Technology, Peter Mell, Timothy Grance, "The NIST Definition of Cloud Computing," pp. 1-7, Sep. 2011.
National Institute of Standards and Technology, Lee Badger, Robert Bohn, Shilong Chu, Mike Hogan, Fang Liu, Viktor Kaufmann, Jian Mao, John Messina, Kevin Mills, Annie Sokol, Jin Tong, Fred Whiteside and Dawn Leaf, "US Government Cloud Computing Technology Roadmap vol. II Release 1.0 (Draft)," pp. 1-85, Nov. 2011.
Wikipedia, Unknown, "Cyptographic Hash Function," pp. 1-6, Mar. 19, 2012.
Wikipedia, Unknown, "Digital Signature," pp. 1-10, Mar. 19, 2012.
Wiley, Bruce Schneier, "Applied Cryptography: Protocols, Algorithms, and Source Code in C, Second Edition," Chapter 2, pp. 21-26, (Oct. 18, 1996).

* cited by examiner

*Primary Examiner* — Nirav B Patel
(74) *Attorney, Agent, or Firm* — Nixon & Vanderhye, P.C.

(57) ABSTRACT

A digital signature is applied to digital documents/information. In certain instances, juridically strong digital signatures are achieved. Cloud computing technologies may be used to aid in the production of the cryptographically secure, authenticated digital signatures. Digital signatures may be produced with a digital notarization. The techniques of generating a digital signature may not require the use of traditional public key infrastructure (PKI).

10 Claims, 9 Drawing Sheets

| Example: Structured Record of *Identity X* 700 | | |
|---|---|---|
| Field | Record Position | Example Content |
| First Name | 1-16 | John |
| Middle Name/Initial | 17-32 | Quincy |
| Last Name | 33-64 | Public |
| Service Identity | 65-128 | JQ.Public@ExampleIdentityService.com |

Figure 7

```
Example: Named-tag Identity X Using XML
<data version="2011-08-01-00">
        <Full_Name>
                <First_Name value="John" />
                <Middle_Name value="Quiggly" />
                <Last_Name value="Publicperson" />
        </Full_Name>
        <Address>
                <Street>
                                        123 Sidney Drive
                </Street>
                <City value="Honolulu" />
                <State value="HI" />
                <Zip_Code value="96848" />
                <Country value="US" />
        </Address>
        <Service url="http://ExampleIdentityService.com" />
        <User_Service_Identity>
                        jqpublicperson@exampleidentityservice.com
        </User_Service_Identity>
</data>
```

Figure 8

NON-PKI DIGITAL SIGNATURES AND INFORMATION NOTARY PUBLIC IN THE CLOUD

FIELD

The technology herein relates to generation of digital signatures that are applied to digital information (e.g., digital documents). More particularly, certain example implementations use juridically-secure cryptographic techniques to generate digital signatures on information/documents without using public key technology, e.g., the use of non-PKI digital signature technology. In certain instances, a digital signature may be used to create juridically-appropriate Notary Public service(s) for digital information.

BACKGROUND AND SUMMARY

Signatures have been around for thousands of years, from John Hancock's signature on the Declaration of Independence, to a simple sailor assigning an "X" to an enlistment paper for a sailing vessel, to a farmer enlisting in a Roman legion for the first time. All of these examples convey the intent of signing party that they are who they say they are and that they will be "bound" to the signed document (or the terms thereon). In more recent times, electronic signatures have been used to covey the same concept. One such variation on an electronic signature is a digital signature. Such digital versions of a signature may be more secure and verifiable than ordinary electronic signatures.

Digital signatures are commonly produced using public key cryptographic technology through the use of standards-based, certificate authority-focused public key infrastructure (PKI); or standards-based Pretty Good Privacy (PGP); or, the nearly equivalent to PGP, GNU Privacy Guard (GPG) public key infrastructure. While these techniques are mathematically appealing, the management necessities of the public key paradigm may have produced enough technical confusion with typical computing users to have worked against their broad acceptance. Further, it seems that juridical acceptance of PKI digital signatures has not been established for day-to-day use. Such techniques are generally harbored and encouraged by computing users who are well-versed in computer science, mathematics, or both.

Digital Signatures

Various references provide a number of necessary building blocks for secure and juridically useful digital signatures. These references include: Bruce Schneier's, *Applied Cryptography: Protocols, Algorithms*, and *Source Code in C*, 2nd Edition, Chapter 2, Section 2.6 Digital Signatures; along with technically acceptable articles regarding "Cryptographic Hash Function" and "Digital Signature."

The basis for a digital signature is the use of a cryptographic hash function as a secure one-way hashing function that mathematically binds a document/information in such a manner that:

1) It is relatively easy, but not necessarily quick, to compute the fixed-length cryptographic hash value for any given document/information where the fixed length cryptographic hash value is generally of considerably shorter length than the document/information;
2) It is not feasible to generate a document/information that possesses a given, valid cryptographic hash value;
3) It is not feasible to modify a document/information without significantly changing the cryptographic hash value; and/or
4) It is not feasible to find two different documents or contextually similar but not digitally equal pieces of information with the same cryptographic hash value. This concept is sometimes referred to as collision resistance.

Examples of important cryptographic hash functions are MD5, SHA-128, SHA-256, SHA-512, and RipeMD-160. However, MD5 and SHA128 may riot be able to satisfy all of the above requirements, particularly the last item identified above. In order to guard against the possibility that similar problems may arise with SHA256 and SHA512, the U.S. National Institute of Standards and Technology (NIST) opened a public competition on Nov. 2, 2007 to develop a new cryptographic hash algorithm/function, which converts a variable length message into a short "message digest" that can be used for digital signatures, message authentication, and many other security applications in today's digital age. The result of this competition will be a cryptographic hash function named SHA-3 and will augment the hash algorithms/functions currently specified in the Federal information Processing Standard (FIPS) 180-3, Secure Hash Standard. The competition is expected to end during late 2012.

Binding an identity value that is juridically-undeniably associated with the signer to a document/information is necessary for a trustworthy digital signature. For convenience and efficiency this identity may be bound to the cryptographic hash function value of the document/information. In addition to fulfilling the requirements of the cryptographic hash function, the resultant digital signature is required to provide measures of signature authenticity, high integrity, non-forgeability, and non-repudiation. Namely:

1) a digital signature is authentic if the means of authentication provides proof that the identity value that is tightly bound to the document/information is secure and tightly bound to the user associated with the identity value;
2) a digital signature achieves high integrity if the digital signature method produces proof that all digitally equivalent copies of the "digitally signed" document/information are proven to have been unchanged since the production of the digital signature;
3) a digital signature is required to exhibit non-forge-ability by providing proof that the identity associated with the signer can not have been associated with someone else; and
4) a digital signature is required to produce non-repudiated juridical evidence that the user associated with the authenticated identity of the high integrity document/information produced the digital signature.

Non-repudiation tends to be the Achilles Heel for authenticated digital signatures. Authentication of non-repudiation is generally dependent on the undeniable use of "something only the signer knows" or "something only the signer possesses". For example, the attributed signer could readily deny having produced a digital signature because someone else masqueraded as the signer by virtue of having acquired the use of the key(s) necessary to generate the authenticity of the digital signature. Thus, the achievement of non-repudiation must be produced with great care and with juridical soundness.

Presently, public key infrastructure (PKI) is the presumed technology for producing digital signatures on digital documents/information. It may be instructive to discuss the means by which PKI attempts to achieve the requirements for producing digital signatures.

PKI Digital Signatures

PKI digital signatures use the private key of a public key technology key pair to encrypt the cryptographic hash function value of a document/information. This resultant value binds the document to the public-private key pair. The public key is further bound into a cryptographic structure called a certificate. This certificate contains identity information which is presumably vouched by a known "authority" that the certified identity is associated with the user of the public-private key pair.

The typical PKI digital signature capability allows the use of essentially any cryptographic hash function. However, the cryptographic hash functions that are used are generally selected from the list of functions that are outlined in the above section on digital signatures, namely MD5, various SHA implementations, and RipeMD-160 cryptographic hash functions. As explained earlier, except for the MD5 and SHA-128 hashes, these hash functions presently satisfy the list of requirements for a cryptographic hash function. Other unlisted hash functions, such as GOST, HAVAL, Whirlpool, fulfill the cryptographic hash function requirements but are not typically relied upon for both technical and business reasons. The authenticity of the digital signature is proven by being able to use a PKI certificate to acquire the public key of a PKI public-private key pair for use in decrypting the cryptographic hash function value. Successful decryption proves the authenticity of the digital signature. Subsequent comparison of a newly calculated cryptographic hash value on the document/information to the successfully decrypted cryptographic hash offers proof of digital signature integrity.

The cryptographic quality of the cryptographic hash function as applied to a document/information offers the necessary proof of the integrity of the digital signature. A strong cryptographic hash produces the juridical proof that a document has not changed since the digital signature was created. Digital signature integrity is proven by calculating a cryptographic hash value of a copy of the document/information in question then comparing it to the decrypted cryptographic hash value in the digital signature. Equal comparison then may prove the integrity of the document or information.

The user's identity bound into the PKI certificate is used to offer proof of non-forge-ability and non-repudiation. The proof of non-forge-ability is dependent on the assurance that there is not more than one vouched-certificate that binds a public key to more than one user's identity.

The proof of non-repudiation requires there to exist juridical evidence that the owner of a public-private key pair has protected the private key sufficiently and without unawares in order that another user can not have digitally signed a document/information using that private key and therefore derogate the value of user's identity bound in the PKI certificate.

Note that a vouched-certificate is one that has been signed by another PKI user with their identity also bound in the certificate. Of course the voucher could possess a certificate which in turn may possess a voucher. This chained vouching produces a difficulty in that the chain must be reasonably finite in length in order to provide an efficient authentication process. The end of this chain possesses a voucher who is self-vouching. This requires the authentication procedure to have a means of trusting this final voucher. A difficulty in this authentication process is the need to be completely assured that each voucher in the chain must be certain of the identity about which they are attributing. Furthermore, the last member in the chain should be trustingly beyond reproach.

The mathematics of public key cryptography is so appealing that much effort has been expended to derive means of making the difficulties, especially those outlined above, more juridically acceptable. Rather than continue with this approach, certain illustrative implementations produce an alternative to the production of digital signatures without using public key infrastructure. In other words, non-PKI digital signatures.

Accordingly, certain illustrative implementations described herein propose a digital signature for "the masses" that produces a digital signature that is cryptographically equivalent to PKI digital signatures while expectantly achieving juridical acceptability. The techniques described herein, in connection with certain example embodiments, may lead to increased user acceptance due to more well-known and/or simpler (e.g., user friendly) implementations for achieving juridical approval.

An added attraction of certain illustrative implementations is the introduction of an Information Notary Public that may be focused on the typical user by providing the Information Notary Public service as a secure Cloud-Computing resource which minimizes user information coordination and management. With the understanding that Cloud-Computing is a model for enabling convenient, trusted, on-demand network access to a shared pool of configurable computing resources, such as, for example, networks, servers, storage, applications, and services, that can be rapidly provisioned and released with minimal management effort or service provider interaction.

Non-PKI Digital Signatures

Certain digital signatures applied to digital information may have properties to supply proof of: 1) document integrity; 2) document digital signature authenticity; 3) a non-forged signed document; 4) evidence of a non-reputable document signature; and 5) a tight binding of the digital identity of the signer to the signer and the digital document.

In certain illustrative implementations, proof of document integrity is offered by application of a cryptographic hash function(s) binding to demonstrate that the document is unchanged since the document/information was digitally signed. However, digital signatures require a binding of a user's identity value to the document/information just as is the case with PKI digital signatures. A difference is that encryption of the cryptographic hash function value of the document/information implicitly binds the PKI certificate user identity to the document/information. In contrast, certain illustrative implementations may explicitly bind an appropriate user identity directly with the document/information using the selected cryptographic hash function(s).

Due to the importance of the cryptographic binding function, it is useful to introduce a resilient variation of the binding by allowing the cryptographic binding to be composed of one or more hashing functions.

For example, using SHA-256 as a cryptographic binding works, but the process may well be made more resilient by applying SHA-256 and RIPEMD-160 as a compound digesting function. If either of these functions become cryptographically unsound the cryptographic binding remains intact. Of course, in the unlikely event that both functions become cryptographically unsound then the binding is unsound. Accordingly, certain example embodiments may use the term cryptographic binding to imply the use of a compound digest function as the cryptographic binding.

A cryptographic binding can be accomplished in at least two ways. One way is for the cryptographic hash function to be applied on a concatenation of the document/information with the value of the appropriately chosen user identity value. This method is an efficient application of the cryptographic hash function(s). This efficiency may be very important when using processing resources with limited computing capacity especially if the cryptographic hash function is a time consuming function on the application processing resource.

A second means of producing a binding is to calculate separate cryptographic hash function values on the document/information and the appropriately chosen user identity. These two cryptographic hash function values may be concatenated whereby a cryptographic hash function can be applied to produce a binding of the document/information with the appropriately chosen user identity. While this technique may not be as efficient in certain respects and may require a more complex generation process, it may also allow applications to make independent decisions on the integrity of the individual parts, e.g.,—the document/information or the appropriately chosen user identity.

With the appropriate encoding, possibly using Abstract Syntax Notation One (ASN.1) or XML, the above noted techniques, or other possibilities could be readily used by certain exemplary implementations. These potential encodings could be subsequently decoded in an application that can produce evidentiary proof of the juridical value as exemplary use of a non-PKI digital signature. In certain instances, such proof may include naively comparing hashes (e.g., digital digests) of the signature and a re-created signature. In certain example embodiments, evidentiary proof may include proof that a secure time-stamp is in fact a valid time stamp for an associated digital signature. Further, non-PKI-based timestamps may independently validate the efficacy of a digital signature via publicly accessible digital witness information.

The choice of user identity cryptographically bound to the document/information may be relevant according to certain example embodiments. Given a user, denoted as U, who desires to digitally sign a document/information then user U must possess an Identity U (e.g., a digital identity) that is unique to, managed, and authenticated by an accessible identity service. A preferred identity service according to certain illustrative implementations is a network cloud-based identity service. The mentioned Identity U may have one or more of the following attributes.

Identity U

Identity U could be a structured container which relates identity attribute(s), $IA_i$, to their actual value(s), $U_i$, to produce an Identity U which may be unique to an appropriate Identity Service. The structure could be a well-defined, ordered record of all of the identity components that comprise Identity U.

In another, possibly more versatile structure, the components could be a set of identity attributes of named tags, $IA_i$, with related tag values, $U_i$. Either of these techniques could readily produce an Identity U. It will be appreciated that there are other possibilities for producing equivalent identities.

The structure may be determined by the requirements of the identity service to produce a unique identity associated with a given identity service. The following examples may be instructive.

An example of a structured container regarding a unique Identity JQ Public is:
John Quincy Public
JQPublic@ExampleIdentityService.com
where the
    first name field", "John", is coded into positions 1-16;
    "middle name/initial field", "Quincy", is coded into positions 17-32;
    "last name field", "Public", is coded into positions 33-64; and
    "service identity field",
"JQPublic@ExampleIdentityService.com", is coded into positions 65-128.

An example of a named-tag identity attributes structure regarding a unique Identity JQ Public for the Example Tagged Identity Service is:

```
<data version="2011.08.01.00">
    <Full_Name>
        <First_Name value="John" />
        <Middle_Name value="Quiggly" />
        <Last_Name value="Public" />
    </Full_Name>
    <Address>
        <Street>
            123 Sidney Drive
        </Street>
        <City value="Honolulu" />
        <State value="HI" />
        <Zip_Code value="96848" />
        <Country value="US" />
    </Address>
    <Service url="http://www.ExampleTaggedIdentityService.com" />
    <Claims value="Author;Owner" />
    <User_Service_Identity>
        jqpublic@exampletaggedidentityservice.com
    </User_Service_Identity>
</data>
```

To this point, an identity service is only necessary for assuring the service-relative uniqueness of the Identity U. The ultimate value of the identity service will be that of producing the mechanisms for fulfilling the requirements of a digital signature that does not use the elements of public key infrastructure (PKI). The Signed By U is the first exemplary implementation of the technology toward that end. However, before the illustrative implementation of Signed By U is discussed, a discussion of cloud-based services, particularly cloud-based identity service is provided.

Cloud-based Service

Certain exemplary implementations may apply the U.S. National Institute of Standards and Technology (NIST) definition of cloud computing. The NIST definition states:

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

The amount of computing resources that may be needed to fulfill the requirements for digital signature services necessitates a number of service essentials. These include:

1) A service that can be quickly scaled and provisioned to meet the need. Commercial cloud services are being developed to offer virtually unlimited resources. By the same token these services can contract as demand wanes in order to be efficient and cost effective.

2) A service with broad network accessibility. Not only is broad network bandwidth required, but also, heterogeneous network accessibility is required for desktop, portable (laptop/tablet), and mobile services.

3) A service which does not require explicit user management or control.

4) A service that specifies and assures published security and privacy models that will affirm juridical necessity.

Accordingly, certain example embodiments may use such a model of cloud-based services. However, other example embodiments may not rely on such a model. In other words, the point to mentioning the model at all is to suggest that digital signature services may demand resources that are more readily met by such a service model. Services that are used according to certain exemplary implementations may be able to fulfill the security and privacy requirements laid out by each of the various forms of the non-PKI digital signature. The simplest form of the non-PKI digital signature is Signed By U. The utilization of cloud-based services is emphasized with respect to certain example embodiments described herein.

Signed By U

Signed By U for the purposes of certain exemplary implementations is a relation to a document(s)/information that is tightly and securely bound to an Identity U. The functional value of the mapping contains the value(s) that establish the temporal existence of the document(s)/information as well as the binding to an Identity U. Note that PKI-based digital signatures do not require proof of temporal existence, and in certain example embodiments such may not be required by non-PKI digital signatures. However, temporal existence of that which is signed may be a preferred approach of digital signatures as a secure and well-defined witness/attestation to the act of digitally signing therefore that importance is emphasized according to certain exemplary implementations. Relaxation of temporal qualifications for digital witnessing the act of signing may be possible but may not be expedient in certain instances. In other words, the act of witness generally tends to have a temporal nature.

Further, Signed By U is not required to be explicitly authenticated using Identity U by an identity service. Presumably the service which provides the temporal existence of the document(s)/information that is bound to Identity U requires some form of authentication for access to the service, but there is no strong requirement that the authentication is bound to Identity U. Moreover, the establishment of the temporal existence of the signing process creates an "early bird gets the worm" condition. Specifically, if a Signed By U condition is used to claim some unique identity attribute such as authorship or ownership and Signed By V registers similar claims, then the "signing" with the earliest temporal existence overrides the later digital signature and its temporal existence. Note, however, that such conditions can become significantly complex so that the crafting of intent of an identity attribute may be established with a certain level of specificity.

Signed By U may be considered "a weak signing condition" since the Identity U is not necessarily expressly authenticated by the identity service. Accordingly, this condition may be strengthened somewhat by the next condition.

Assuredly Signed By U

A document/information is Assuredly Signed By U if the document/information is associated with a Signed by U condition and U has been established as an authentic identity via an authentication service of an Identity U associated with the Signed by U condition. In other words, the authentication service for an Identity U may be a function of the Identity Service so that the Identity Service may be assured that the Identity of U is directly related to the user "U".

This signing condition is stronger since the Identity U is cryptographically bound to the document/information while the Identity U is explicitly used as the primary user identity for the authentication process with the Identification Service.

Such techniques may be further adjusted with an identity which should be considered juridically stronger than the general Identity U.

Registered Identity U

A juridically stronger identity is a Registered Identity U. This manner of identity is generated by:

1) Having the identity service produce a document that defines the contractual terms and conditions for authentication of the identity service which is accepted by the requester of the Registered Identity U;

2) As part of the review and acceptance of the terms, cryptographically bind the contract to the authenticated Identity U associated with the requester by using the Registered Identity U;

3) Acceptably establish (e.g., securely) and authenticate a user utilizing an associated Identity U uniquely through a desirable identity service;

4) Produce the cryptographic binding of the contract to the registered identity service on the requester's computing/reviewing resource;

5) Validate the cryptographic binding by independently recalculating the binding of the contract with the Identity U for comparison to the value produced on the user's computing resource;

6) Establish the secure temporal existence of this contract and Registered Identity U to create the Registered identity U of an Identity U; and 7) Assemble for subsequent use as the Registered Identity U of an Identity U with the cryptographic binding of the contract document and the Identity U along with a secure temporal existence certification.

Subsequent use of this Registered Identity U establishes the terms and conditions recognized by the creating and authenticating identity service. Such an identity applied as part of a digital signature on a document/information should have significant juridical force.

Document/Information Digital Signature

The aforementioned application of a Registered Identity U for the creation of a Signed By U condition on a document/information may be considered a Document Digital Signature or Information Digital Signature.

Note that PKI does not necessarily enter into this process unless, implicitly, the secure temporal existence service utilizes PKI for creation of the secure temporal existence seal. Other forms of a secure temporal existence service offer appealing qualities such as widely-witnessed certificates of temporal existence. These certificates can be independently authenticated for proof of validity. Such secure temporal existence (e.g., a certificate thereof) may be establish based on techniques described in U.S. Publication 2012/0011359, the entire contents of which are hereby incorporated by reference.

A variant on Document/Information Digital Signature uses a Registered Identity of the Identity Service to produce the potential for a digital apostille notary service, producing an Information Notary Public.

Information Notary Public

An Information Notary Public may be a cloud-based identity service that possesses Registered Identity(s) of the Notary Service. In the case of an apostille notary service the Registered Identity of the Notary Service is established with an Apostille Identity service such as a State Identity Service. The notary service, responds to a request for notary services on a Document/Information Digital Signature by:

1) Authenticating the Registered Identity U associated with the Document/Information Digital Signature;

2) Generating a Document/Information Digital Signature on the above Document/Information Digital Signature associated with the authenticated Registered Identity U; and 3) Binding this "notarized" digital signature with the associated Document/Information Digital Signature.

Certain illustrative implementations may include several means of producing digital signatures on documents/information without necessarily using public key infrastructure (PKI). An aspect of certain illustrative implementations is that of devising a simple, typical user interface which is a secure means of accomplishing digital signatures for digital information. Another aspect of certain illustrative implementations is to utilize techniques that are familiar to a user's experience for managing digital information signatory matters in a manner similar to the management of signatory matters in the traditional paper world.

Signatory management using public key infrastructure (PKI) is mathematically and technologically appealing, but seems to be a source of mystery and confusion to The Celebrated Man In The Street (TC Mits). See the introduction of TC Mits from Lilian Lieber's book, "The Einstein Theory of Relativity: A Trip to the Fourth Dimension". Certain illustrative implementations may not require special management of keys. Certain example embodiments may use authentication of a signer's identity as is the case with PKI digital signatures.

Note, too, forms of non-PKI digital signatures are bound to a proof of the temporal existence of the digital signature to its associated information object. Such may not be the case with standards-compliant PKI-based digital signatures. As previously mentioned, temporal existence of the digital signature can be replaced by other means of proof of authentication by the identity service for a light-weight digital signature. Using a temporal existence service as a binding to authentication by the identity service is a convenient and simple solution besides usefully adding proof of existence in time. Producing a signature for seemingly most transactions is accompanied by a reference to the temporal existence of the act of signing. Furthermore, if the temporal existence service uses widely-witnessed techniques for proof of temporal existence then independent validation of authentication is an added quality according to certain example embodiments.

It should be noted that the production of digital signatures accordingly to certain example implementations can be fulfilled using a mobile computing system such as a mobile smart phone as the user's digital signing agent. The smart phone can be used to assure content agreement as well as the agent for producing the secure binding of document to digital identity. Use of the smart phone along with cloud-based services may enhance the appeal of certain exemplary implementations.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 7 is a Structured Record of an Identity U and includes a structured layout of an Identity of John Q Public;

FIG. 8 shows a XML example of a named tag structure of an Identity of John Q Public as another means of presenting an Identity U.

DETAILED DESCRIPTION

Certain example embodiments herein relate to digitally signing documents. In certain instances, the technique for applying a digital signature to a digital document (or information) is accomplished through the use of non-public key infrastructure.

Data Flow of Non-PKI Digital Signatures

Figure 1:
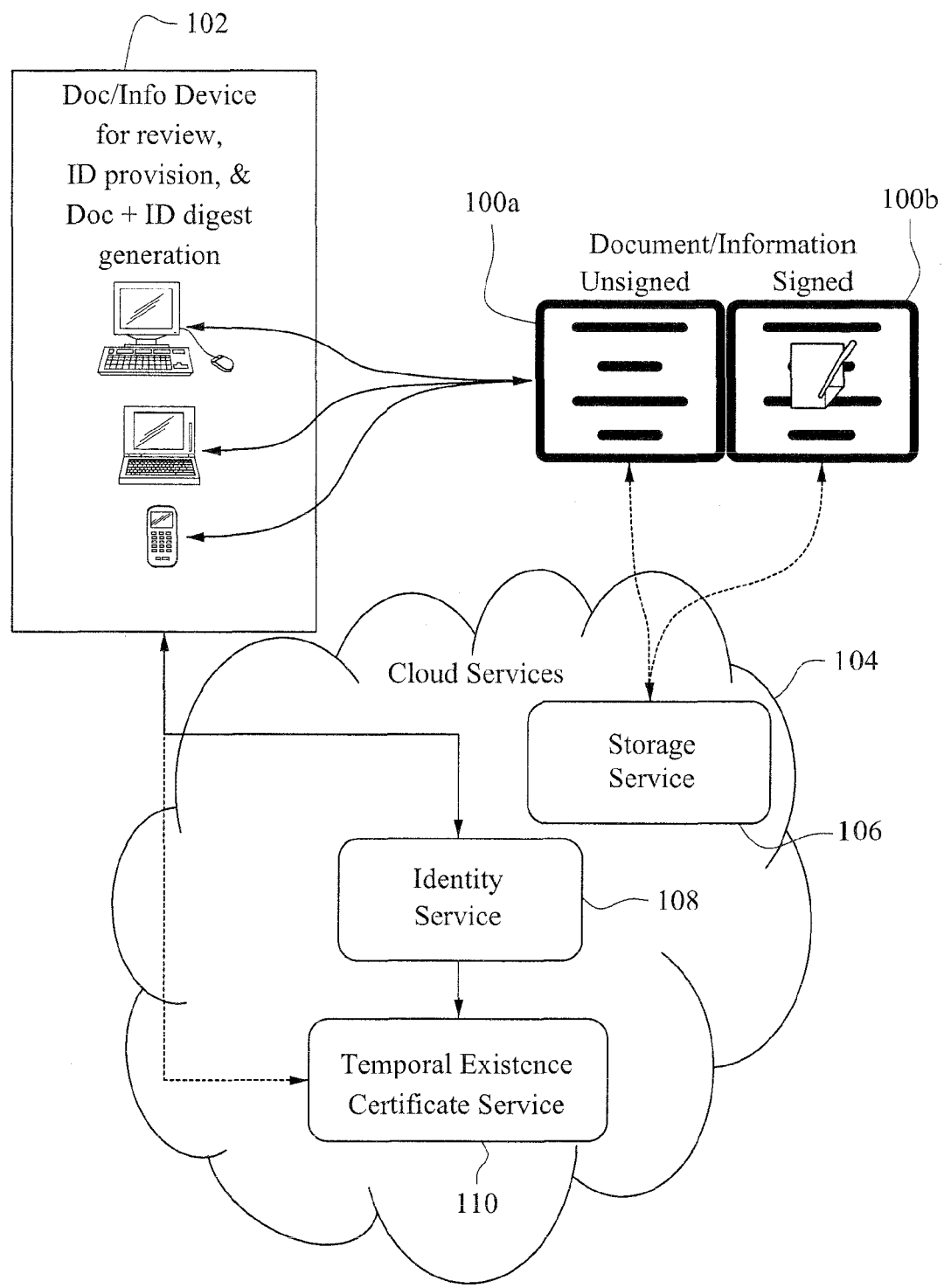
FIG. 1 illustrates a data flow for obtaining a non-PKI digital signature according to certain example embodiments.

FIG. 1 illustrates a data flow for obtaining a non-PKI digital signature according to certain example embodiments. Here, a graphical summary shows the flow of data among digital documents, user signing tools, and cloud-based services to fulfill the generation of the various forms of certain example techniques and/or implementations described herein (e.g., without using public key infrastructure (PKI)).

According to certain example digital signature techniques, access to a digital document or information 100a that requires a signature for appropriate signatory sufficiency is provided. A digital document or information may reside in a variety of places. For example, the document/information may reside in the "cloud" 104 such as on a private or public cloud-based storage service 106 or a user-accessible computing device 102. A typical user-accessible computing device 102 could be a desk-top computing system, laptop device, mobile tablet, mobile phone, or other user computing resource. In certain preferred instances, the user-accessible computing device may be a mobile phone with smart phone computing capability. Such devices may use their processing capabilities to carry out certain cryptographic tasks associated with obtaining a digital signature.

Once the document/information 100a is accessed, it may be reviewed by the user on a computing device which possesses functionality to enable the user to review the documents/information. In certain example embodiments, the computing device may be capable of providing a user's digital identity which may be associated with a generated digital signature. Furthermore, the computing device may cryptographically bind the document/information to the user's digital identity. In certain example embodiments, a compound cryptographic digest function may be used to implement such features. Such digest functions may include those noted above, for example, the MD5 and SHA-x (e.g., SHA-1) variety of hash functions including those for the soon to be named SHA-3 hash function (e.g., Keccak, JH, Skein, etc).

Once the cryptographic binding is generated, the compound digest binding and the user's digital identity are securely and trust-worthily communicated to an appropriate Identity Service 108 in order that the user's identity is authenticated in accordance with the requirements of the Identity Service. This authentication may then be digitally witnessed by a digital witness service. In certain example embodiments, the digital witness service may be the Temporal Existence Certificate Service 110. Further, in certain example embodiments, the user may directly establish the user's rights for use of the Temporal Existence Certificate Service 110. In such an instance, the user may not only communicate to the Identity Service 108 the previously noted compound digest binding and authentication identity, but also may communicate the established secure authentication tag of the user's rights to the Temporal Existence Certificate Service 110.

The generation of the temporal existence cryptographic binding structure combined with the user's cryptographic binding of the document/information to the authenticated identity may produce an exemplary non-PKI digital signature according to certain example embodiments. The above elements may be subsequently gathered on the user's device 102 to relate the signed document/information 100b that was the subject of the data flow.

In certain example embodiments, a digital signature is generated on a specific rendition of a document.

Digital Signature Generation

Figure 2:
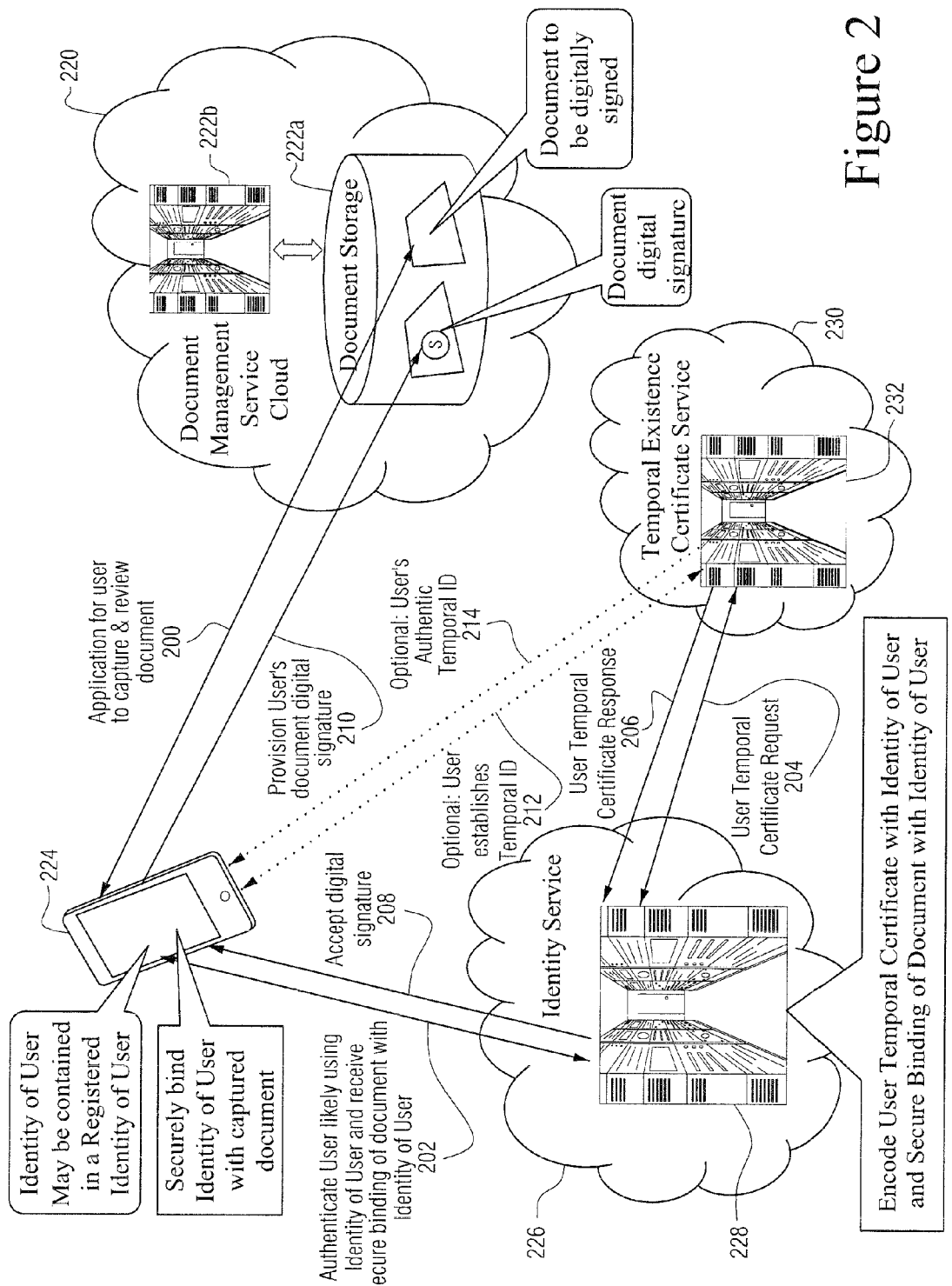
FIG. 2 illustrates generation of a digital signature whereby a non-PKI digital signature is devised for a document that has been acquired from a document storage service via a user's mobile computing resource according to certain example embodiments.

FIG. 2 illustrates generation of a digital signature whereby a non-PKI digital signature is devised for a document that has been acquired from a document storage service via a user's mobile computing resource according to certain example embodiments.

In step 200 the digital signature generation process according to certain example embodiments may begin. Specifically, a request (e.g., a bi-directional request) for retrieving a digital rendition of a document may be sent to a document management service 220. Such a service can be provisioned from a document management cloud service or a file system. In certain example embodiments, the document may be provided by a user (e.g., located on the user's computer resource). The document management service may include processing resources 222b (e.g., servers and/or on demand computing resources in the "Cloud."). The processing resources may include or communicate with document storage 222a.

The document acquired in step 200 may be reviewed on the requesting user's computing resource 224. The review may be via an audible interface (e.g., speakers) and/or a display device, such as, for example, an LCD display. As part of this review, the user may determine if there is a need for producing a digital signature. It will be appreciated that while reviewing the document, it may be stored in a storage medium of the user's computing resource. Once the document is warranted for a digital signature, the user may be assigned a digital identity from the user's computing resource 224. The creation of such a digital identity may be performed by a processing system on the user's computing resource 224. It will be appreciated that the user may be given a digital identity from another computing system (e.g., an Identity Server or other "authority")

It will be appreciated that the user account used by the user on a given computer may be assigned the digital identity. In certain example embodiments, the digital identity may be associated with a globally unique identifier (e.g., a MAC address or system ID). The assigned identity may include a simple identity or a registered identity. In certain example embodiments, a digital identity may be created at this point (and also registered as described herein) or an existing digital identity may be used. As explained in greater detail herein, in certain example embodiments, the type of identity may correspond to or determine the juridical quality of the digital signature. The identity may be a digital symbol with which the user wants the generated signature to be associated. In any event, a user resource application may cryptographically bind the reviewed document with the selected digital identity for subsequent authentication. Specifically, in certain example embodiments, a hash function or compound message digest (e.g., as described herein) may be applied (e.g., via a processing system) to the combination of the digital identity and the document or information to produce the cryptographic binding. In certain instances, the digital identity may be hashed with one hash function, the document with another hash function and the combination of the hashed identity and hashed document hashed with another hash function. In certain example embodiments, a combination of multiple hash functions may be used to produce a compound message digest which will be used as the "hashing" function to be applied to the document, the digital identity, and the binding of the document to the identity. The combination of these compound and/or different hash functions may function to improve the secure nature and cryptographic resilience of the cryptographic binding (e.g., if one hash function becomes compromised, as with MD5).

In step 202, the process may continue with bi-directional communication (e.g., from a communication interface on the user's computing 224 resource to a transceiver of the identity service 226) whereby the user's identity may be authenticated by the Identity Service 226. Such authentication may be carried out via processing hardware 228 that is part of the identity service. Such processing hardware may include or be coupled with processing units, memory and storage disks (e.g., non-transitory storage mediums), and/or network interfaces (e.g., a network card) that can receive and transmit information. In certain example embodiments the hardware may include the various hardware components show in FIG. 9. Further, as can be seen from FIG. 2, the user's computing resource 224 may be remotely located from the identity service and its associated hardware.

In certain example embodiments, the Identity Service may be a cloud based service. The identity with the Identity Service authenticates the user after receiving a digital authentication request, and may also determine the juridical value of the digital signature to be generated. The Identity Service may use a user-provided identity authentication in accordance with techniques required by the Identity Service.

In certain example embodiments, if the authentication identity is the same as the Identity of the User that is cryptographically bound to the document, then the digital signature may be assuredly bound to the Identity of the User. If the authentication identity is different from the cryptographic binding associated with the document, then a lesser quality digital signature may be produced (e.g., a signature that is not as tightly bound). If a Registered Identity of the User is used for authentication with the Identity Service, then a Document Digital Signature may be produced. This form of digital signature may be more juridically strenuous than other implementations.

The digital identity of the user, the user's account, and/or the registered identity may be stored on a computer readable storage medium of the identity service 226 after being received from the user's computing resource 224 via a transceiver interface.

Also in step 202, the user computing resource 224 may generate and/or communicate the cryptographic binding of the Identity of the User. For example, if the authenticating identity is not the same as the user's digital identity then the digital identity may be communicated in step 202.

In certain example embodiments, if optional steps 212 and 214 are exercised for direct user authentication to the Temporal Existence Certificate Service 230, a captured temporary Temporal Existence Certificate authentication tag, discussed in more detail below, may also be exchanged (e.g., transmitted) to the Identity Server 226 for subsequent use in authorizing access for the Identity Service 226 to the Temporal Existence Certification Service 230.

In other words, according to various embodiments, a digital identity, a cryptographic binding of the document/information and digital identity in question, and/or a temporal existence authentication tag/token may be transmitted to an identity service in step 202. Such elements may facilitate the production of a digital signature that is associated with the document/information. It will be appreciated, that transmitting the digital rendition of the document may be undesirable and/or unnecessary in certain situations. For example, if the parties signing a digital document are concerned about confidentiality with respect to the contents of the document, they may not want a third party (e.g., the identity service) with access to the digital document. Accordingly, in certain preferred embodiments, the digital document is not transmitted to the identity service. However, if circumstances require the transmission of a digital document (or a hash thereof), such may be transmitted and it may or may not be used in the creation of a digital signature by the identity service.

In step 204, the identity service 226 may issue a user temporal certificate request. In certain example embodiments, such a request may include a request for authentication from a digital authentication service for the identity service to act as an authenticate identity service for providing a digital signature to a user. In certain instances, this digital witnessing may be done to ensure that the identity service is authorized to interact with a temporal existence service. In other words, if the identity service is not authorized, it will not be able to facilitate the digital signature request by the user. Thus, in certain example embodiments, the temporal existence service (or other digital witness service) will "control" whether the digital signature process proceeds.

As an example, when a user obtains a temporal existence tag/token via steps 212 and 214 and then subsequently transmits this token via step 202 to the identity service, the token may identify a particular temporal existence service that the parties (e.g., the user and/or a bank in a mortgage contract scenario) may want to use. Accordingly, the chosen identity service may then be required to authenticate against the same temporal existence service, not of its own cognizance but that of the user. In certain example embodiments, the passage of the token from the user to the identity service may act as a proxy for the authentication of the identity service to the temporal existence service. Further, as described in more detail below, not only may a user "register" with an identity service, but an identity service may also register with a temporal existence service. In certain example embodiments, one of these authorized accesses may be used to obtain the Temporal Existence Certificate for use as the digital witness certification.

Returning to step 204, the Identity Service 226 may request or obtain a digital witness certification. The obtained digital witness certification may be based on the cryptographic binding received from the user's computer resource 224 in step 202. In certain example embodiments, the obtained digital witness certification may be based on the temporal existence tag/token.

It will be appreciated that while FIG. 2 shows the identity service 226 and the temporal existence certificate service 232 on separate processing hardware 228 and 232, respectively, these services may be provisioned on same processing clouds (e.g. the same server system that includes a processing system). Such a system may be managed by one entity (e.g., a trusted identity service that also provides temporal existence certificates) or a cloud provider may provision separately managed application services for the Identity Service and the Temporal Existence Certificate Service.

After receiving the user temporal certificate request in step 204, the Temporal Existence Certificate Service 230 that is located on one or more computing resources (e.g., servers or data center in the "Cloud") may produce a Temporal Existence Certificate that is based at least on the cryptographic binding of the Identity of the User with the digital rendition of the document. This may produce a digital witnessing of the digital signing event as well as authentication of the Identity of the User by the Identity Service.

In step 206, the published response of this digital witness process may be accomplished by returning the produced temporal existence certificate to the identity service 226 (e.g., as a user temporal certificate response). In certain example embodiments, the temporal existence certificate may include, or be, a secure-time stamp certificate. Thus, the identity service 226 may obtain a digital witness certification.

In accordance with step 208, the Identity Service may package the temporal existence certificate, the cryptographically bound Identity of the User with the digital rendition of the cryptographic binding of the document, and identity of the user to generate a digital signature. The generated digital signature may be returned (e.g., via a communication interface of the identity service 226) to the user and/or the user's computing resource 224. Thus, in certain example embodiments, the generated digital signature may be based on the cryptographic binding, the temporal existence certificate, and/or the digital identity of the user.

In certain example embodiments, it may be useful to record the digital signature in digital proximity with a digital rendition of the requested document. Accordingly, in step 210 the original document to be digitally signed may now be stored as a digitally signed digital signature document in document storage 222a. It will be appreciated that the digitally signed document may be stored in a location that is different than that of the original document (e.g., another storage medium).

To reiterate a possible need for user-proxied access by the Identity Service to the Temporal Existence Certificate Service, in step 212, a request for a temporal identifier may be made from the user's computing resource 224 to the temporal existence certificate service 230. Specifically, in certain example embodiments, a user can arrange authentic access of the user to a Temporal Existence Certificate Service 230, running on computing system 232, for subsequent production of a certificate at the behest of the user (e.g., the user requests the certificate). This request may be a bi-directional communication of an authenticated request for a temporal existence certificate authentication tag or ticket.

In step 214 and responsive to this request, the user computing resource may receive a temporal identifier (e.g., a receipt may be sent over a secure communication link). The temporal identifier may include a temporary temporal existence certification authentication tag.

Further, as noted above, the temporary temporal existence certification authentication tag may be received by the identity service 226 in step 202. This authentication tag may then be transmitted (e.g., by a transceiver interface that is included in the identity service 226) in step 204 to the temporal existence service for authentication thereto. The exercise of these steps may be due to there not being an appropriate business arrangement between an Identity Service and a Temporal Existence Certificate Service for a direct exchange of digital witness certifications. Accordingly, the user may provide for such an arrangement, while the Identity Service and the Temporal Existence Certificate Service must be able to participate in a proxied authentication exchange protocol.

Generation of Registered Identity of a User

Figure 3:
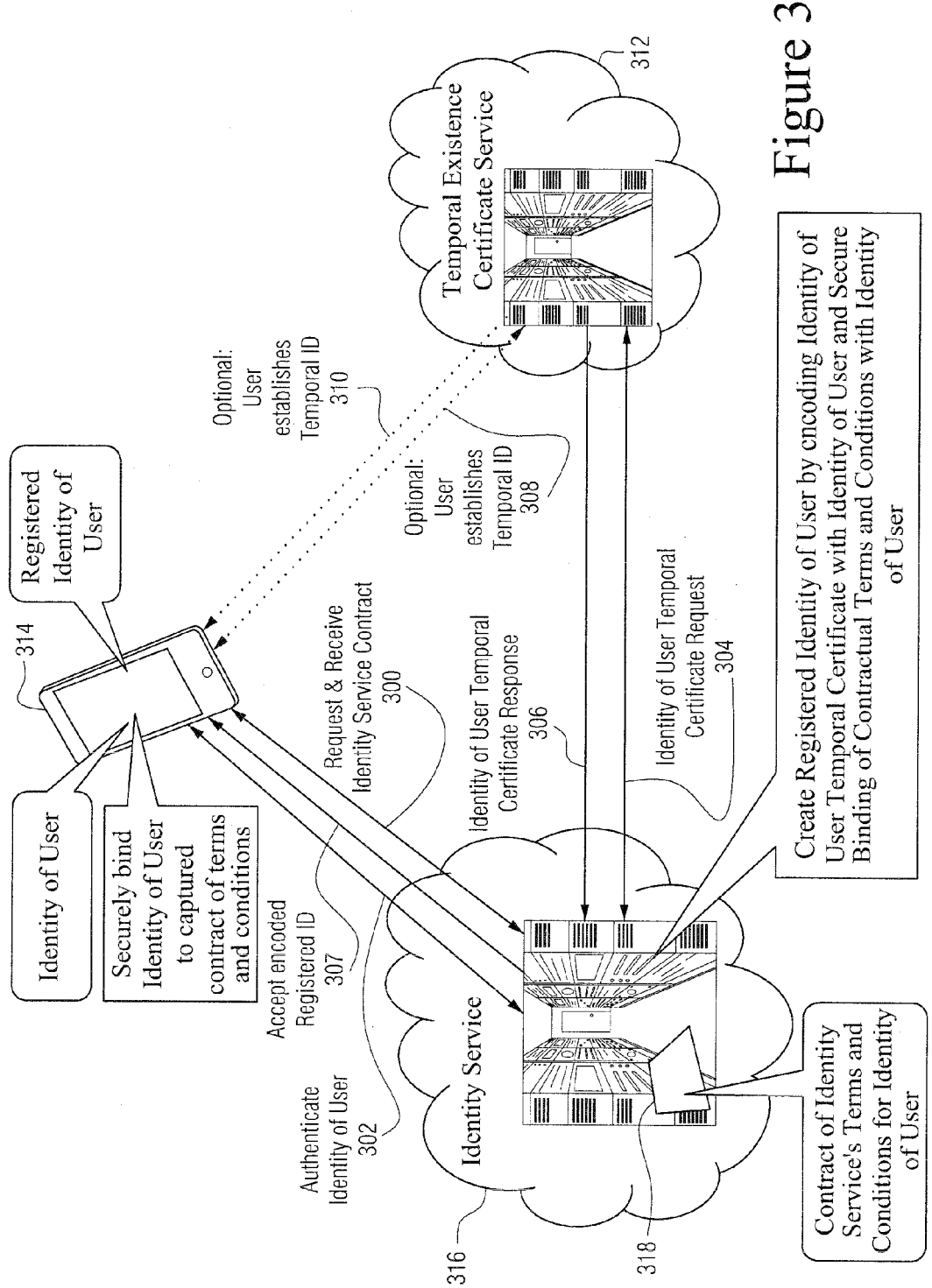
FIG. 3 illustrates the generation of Registered Identity of User according to certain example embodiments.

As previously mentioned, the Identity of the User can be ascertained from a Registered Identity of the User. FIG. 3 illustrates the generation of Registered identity of User according to certain example embodiments. Such identities may be designed to encourage juridically secure identities for highly trusted digital signatures and digitally notarized digital signatures. In certain example embodiments, production of a Registered Identity of a User may be an application of the Assured Digital Signature of a User.

In step 300, a generation of a Registered Identity of a User begins with a bi-directional communication from the user's computing resource 314 to the Identity Service 316 that is responsible for validating the identity of a user. The user requests the digital rendition of the contract 318 which states the terms and conditions whereby the Identity Service 316 expresses the mutual responsibilities of the identified parties.

For example, the terms and conditions of such a contract may include: definitions of the necessary and optional identity attributes of the user; responsibilities of the identity service toward validating these attributes for the user; responsibilities of the identity service toward maintaining user privacy; responsibilities of the user toward maintaining the requirements for establishing authentic access to the identity server; means of establishing authentic access of the identity server to a Temporal Existence Certificate Service; the a particular (or list of) Temporal Existence Certificate Service to be used; etc. . . . In any event, the user reviews the contract for the identity service and then cryptographically binds the digital rendition of the contract to the Identity of the User.

In certain example embodiments, step 308 may be performed if the user is to be responsible for the acquisition of a Temporal Existence Certificate from a Temporal Existence Certificate Service 312. The bi-directional communication at step 308 may be a request for access rights by the user to subsequently acquire a Temporal Existence Certificate from the service.

In step 310, the request is fulfilled by the Temporal Existence Certificate Service 312 returning a temporary service access tag over a communication link (e.g., a secure communication link).

In step 302, the user's computing resource 314 performs a bi-directional request for authentication of the user using the Identity of the User which will be registered. This communication may exercise one of the authentication tenets of the Identity Services contract of terms and conditions. Such tenets may include, for example: the communication of the Identity of the User with all of the identity attributes required by the identity contract terms and conditions; the necessary authentication secret exchanges for binding the user to the Identity of the User; etc. . . . It is at this point that the Identity Service 316 receives the user's calculated cryptographic binding of the contract with the Identity of the User. After this capture of the cryptographic binding, the Identity service may recalculate this cryptographic binding since it is the owner and provider of the digital rendition of the contract. In certain example embodiments, if the user's cryptographic binding matches the Identity Service's cryptographic binding then the Identity Service proceeds to step 304 in order to obtain a digital witness of the authentication of the Identity of the User as well as binding the identity to the contractual terms and conditions.

Step 304 may be a bi-directional communication whereby the Identity Service requests a Temporal Existence Certification of the cryptographic binding. Specifically, in step 304 a request is performed to the Temporal Existence Service 312 that includes the received cryptographic binding. The Temporal existence service may then generate a response that is a digital witness of the cryptographic binding. The response may be returned as digital witness (e.g., a certificate of temporal existence) via step 306.

The acquired Temporal Existence Certificate is then combined, by the identity service 316, as the witnessed cryptographic binding of the Identity of the User with the digital rendition of the identified contractual terms and conditions. This packaging may also include the Identity of the User to produce the Registered Identity of the User. In other words, a temporal existence element (e.g., that may be based on a secure time-stamp), the cryptographic binding of the digital contract and the digital identity, and the digital identity may be combined to form a registered user identity. The combination and/or individual elements may be encoded (e.g., XML or ASN.1 encodings) according to certain example embodiments.

In step 307, this established registered identity may be sent to the user's computing resource 314 for subsequent use as the Registered Identity of the User in applications of digital signature generation. Further, the Identity Service may record this Registered Identity in the Identity Service's data management service (or with a 3rd party data management service) so that it may be associated with the identity of the user in connection with user authentication requirements.

It will be appreciated that more complex variations on this data flow can produce digital signatures using registered identities, as well as digitally notarized digital signatures according to certain example embodiments.

In certain example embodiments, a registration process (e.g., as shown in FIG. 3) may be applied to an identity service. Specifically, an identity service may register its digital identity with an authorized identity service. This may create a registered digital identity of the identity service. In other words, the identity service may have a digital identity that is a registered identity. For example, the identity service may be registered with an authorization service such that the identity service may be authorized to provide digital signature functionality, namely Notary Public functionality, to a requesting user or their computing resource.

Digital Mortgage Contract Signing Example

Figure 4:
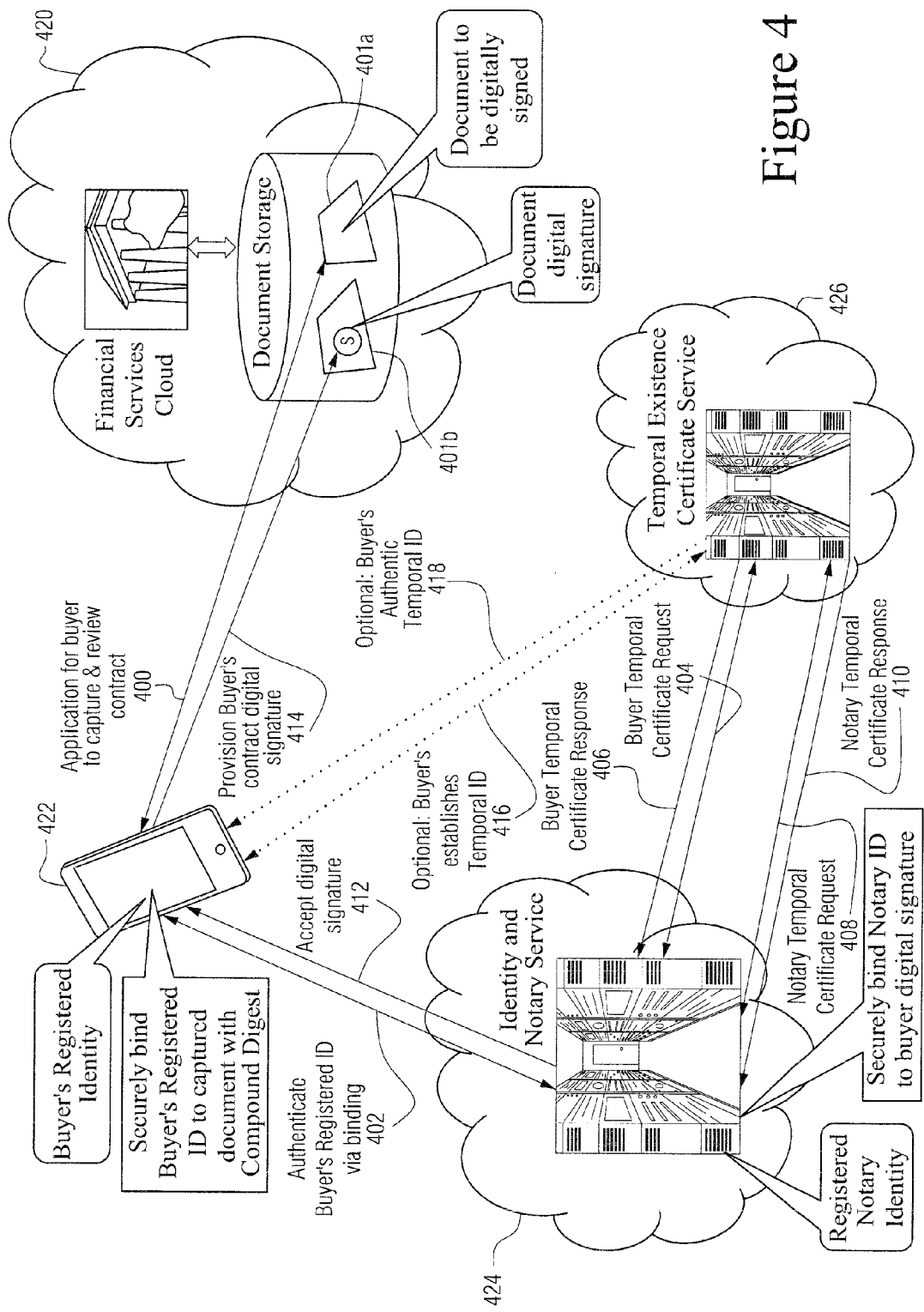
FIG. 4 illustrates digital signature and notarization of contract signing via actions taken by a new home buyer using a smart-phone to digitally sign an acquisition contract using non-PKI digital signature techniques according to certain example embodiments.

FIG. 4 illustrates digital signature and notarization of contract signing via actions taken by a new home buyer using a smart-phone to digitally sign an acquisition contract using non-PKI digital signature techniques according to certain example embodiments.

An illustrative digital signing process may begin at step 400 when a buyer requests and receives a mortgage document 401a that is stored in Finance Cloud 420. The digital rendition of the new mortgage may be provided to the buyer for their review (e.g., on a display of the computing resource 422) and subsequent agreement on the buyer's computing resource 422 (e.g., a smart-phone or tablet) using an exemplary implementation of the digital signing application managed on the buyer's device. Once the buyer reviews the contract and is satisfied by the terms and conditions of the mortgage contract, the buyer may select a digital signing application action on the smart phone.

The digital signing process may use a digital form of the contract 401a (e.g., a transmitted copy thereof) to which to apply a compound message digest associated with the digital signing process. This digital rendition of the mortgage contract is resiliently "hashed" via a compound message digest application function to produce a secure binding as the basis for digital signing. The buyer may then select the digital identity by which she wants to be known through this mortgage contract. This digital identity, which may be a Registered Identity X, is resiliently "hashed" using a compound message digest application function. In certain example embodiments, this compound digest function may be the same function or may be a different function.

In certain example embodiments, the document "hash" and the Registered Identity of the Buyer are concatenated, and then "hashed" by a compound message digest application function to generate a candidate digital signature to be finalized by an identity service acceptable to both the buyer and the mortgage company.

Once the contract has been cryptographically bound to the Registered Identity of the Buyer, the bound identity may be authenticated by an Identity Service that is acceptable to both the buyer and the mortgage institution. The establishment of the authenticity of the Registered Identity of the Buyer is accomplished according to the communication authentication protocol that is acceptable to the Identity Service 424.

In certain example embodiments, the buyer may establish her identity directly to the Temporal Existence Certificate Service 426 via step 416. The Temporal Certificate Service 426 may provide a secure authentication token back to the buyer's smart phone via step 418 over a secure trusted communications portal. The returned token may then be used by the Identity Service 424 to securely acquire a temporal certificate once the buyer's Registered Identity of the Buyer is authenticated if the steps 416 and 418 are invoked.

In step 402, a communication between the buyer and the Identity Service 424 is performed in order to have the buyer's Registered Identity be authenticated. This may be accomplished by providing the Registered Identity of the Buyer along with a compound "hashed" binding of the contract and the identity. In certain example embodiments, the secure authentication token provided via step 418 may be sent to the Identity Server 424.

The Identity Service 424 may require a certain authentication protocol to be followed. In certain example embodiments, this may be as simple as producing a pass-code that is associated with the Registered Identity of the Buyer. In certain example embodiments, more secure authentication methods may be used such as, for example, two-factor authentication. In particular, in addition to a pass-code, a second step may include verification code that is generated on the buyer's smart phone in synchrony with the Identity Service and the Registered Identity of the Buyer.

In step 404, after the Identity Service 424 authenticates the buyer's Registered Identity of the Buyer at step 402, a request for a buyer's temporal certificate of the compound digest of the mortgage contract and the Registered Identity of the Buyer may be made to the Temporal Existence Certificate Service 426. In certain instances, this may be referred to as a time-stamp server or service.

The request, step 404, to the Temporal Existence Certificate Service may be issued, step 406, based on the Registered Identity of the Buyer. In certain example embodiments, the request for the buyer's temporal certificate to digitally witness the buyer's authenticated digital signature may be issued by the Identity Service on behalf of the buyer. In other words, a request by the Buyer to establish a temporary Temporal ID tag in step 416 may result in a subsequent transmission of the tag to the buyer computing resource 422 at step 418. This temporal ID tag may be communicated in step 402 to the identity service. The Identity service 424 may then gain authenticated access at step 404 to the temporal existence service 426 and obtain the requested Temporal Certificate in behalf of the buyer at step 406.

In certain example embodiments, if authentication of the request in step 404 is needed, then an authenticated proxy (e.g., in the form of an authentication token) request by the Identity Service 424 may be used. As discussed herein, the buyer's computing resource may have an authentication token via step 418. Thus, in certain example embodiments, the buyer's Temporal Certificate Service authentication token may be passed securely through a secure trusted connection to the identity service 424. This token may then be forwarded in step 404 to the temporal existence certificate service 426. The Temporal Certificate Service 426 may then fulfill the request by sending, via step 406, the requested buyer's temporal certificate. In certain instances, this may be then result in the generation of the buyer's registered identity digital signature.

In certain example embodiments, if the signatory process does not require notarization, then the digital signature may be accepted via step 412.

However, in certain instances, such as this mortgage contract, a financial institution may require the buyer's digital signature to be notarized. The requirement can be fulfilled by the Identity Service also being an apostille digital notary service.

Accordingly, in certain example embodiments, the Identity Service may apply a compound message digest to securely bind the buyer's digital signature generated via communication at step 406 to the Identity Service's Registered Notary Public Identity. After such a binding, in step 408, the Identity Service may request another temporal certificate from the Temporal Existence Certificate Service 426 (or another different temporal service). In turn, the Temporal Certificate Service 426 may respond back at step 410 with the requested temporal certificate.

Based on the above response, the Identity and Notary Service 424 may then notarize the digital mortgage contract. The response may also be packaged and communicated via step 412 back to the buyer's smart phone 422 as the resultant buyer's notarized digital signature for the mortgage contract. Accordingly, this signatory result may then be communicated in step 414 back to the mortgage institution for appropriately, digitally associating the signature with the digital mortgage contract. Thus, the buyer may now have a signed and notarized mortgage contract 401b that is stored with the financial institution in their "cloud" 420 (or elsewhere, such as a storage location of the buyer's choice).

Sets of Digital Signatures

Figure 5:
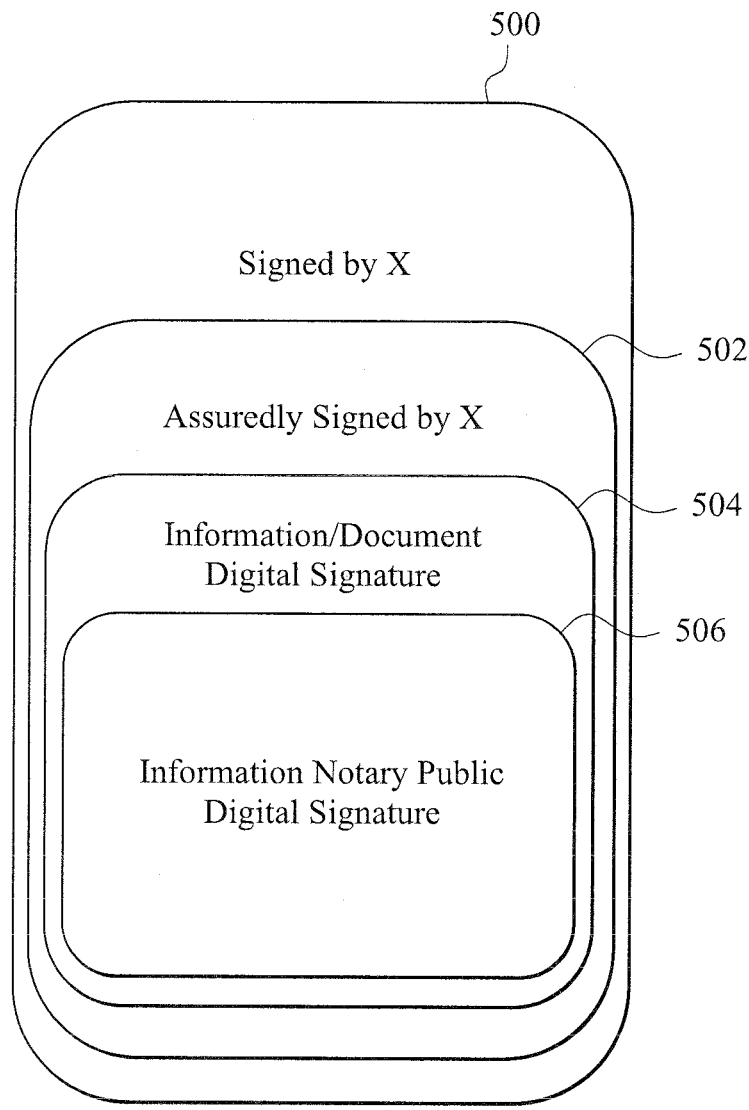
FIG. 5 is a Venn Diagram of digital signature types of certain example embodiments related to non-PKI digital signing.

FIG. 5 is a Venn diagram of digital signature types of certain example embodiments related to non-PKI digital signing. The diagram may illustrate the architectural similarities of certain example forms of digital signing as well as the expected juridical acceptability of each form.

This Venn diagram of four exemplary types of digital signatures illustrates a general (Signed by X) 500, to a more restrictive Assuredly Signed by X 502, to a further restrictive signature 504, to an even more constrained, but juridically strong (Information Notary Public Digital Signature 506) type of digital signature. The Venn diagram shows that each of the succeeding digital signatures is a subset of the preceding set of digital signatures. Also, the inner most digital signature type (Information Notary Public Digital Signature 506) possesses the strongest security fulfillment of those shown.

Accordingly, each of the signature types may possess relatively relaxed signing conditions in order to be adequate for some signing requirements. Interested parties will find that the inner-most digital signature type (Information Notary Public Digital Signature 506) is quite strong toward meeting any juridical signing requirements.

Cloud Services for Non-PKI Digital Signature

Figure 6:
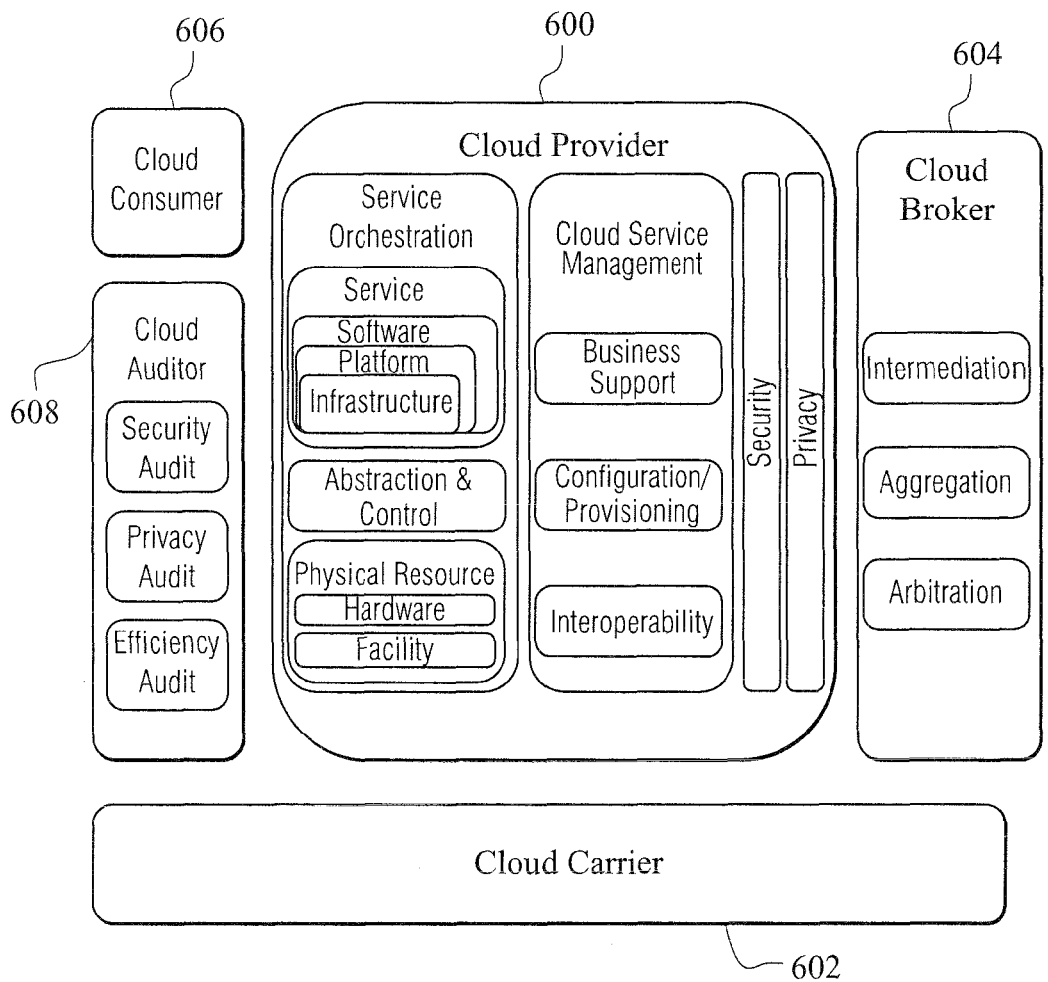
FIG. 6 is a exemplary illustration of a cloud computing service according to certain example embodiments.

FIG. 6 is an exemplary illustration of a cloud computing service according to certain example embodiments. The model may be related to the Cloud computing standards defined in the NIST (National Institute of Standards and Technology) Special Publication 500-291, "NIST Cloud Computing Standards Roadmap."

The actors associated with a computing cloud are provided herein in order to better understand the role and requirements that cloud services may play according to certain example embodiments.

In particular, the above noted NIST model may clarify the means whereby the various roles in certain example non-PKI digital signature processes are to be accomplished efficiently, generally, and/or economically. The NIST model may delineate components that are used to provision and maintain a quality cloud service.

Of course, it will be appreciated that certain example embodiments may utilize other non-cloud based services or implementations to carry out the techniques described herein. However, use of the NIST model (or a model based thereon) may be used in certain preferred embodiments.

Referring to FIG. 6, an example of cloud services is provided in which there are Cloud Providers 600 and Cloud Consumers 606. In certain example embodiments, an Identity Service may be a cloud consumer 606 and a Temporal Existence Service may be a cloud provider 600. It is noted that an example identity service may be both a cloud consumer 606 (e.g., using services from a temporal existence service) or may be a cloud provider (e.g., providing services to a user).

A cloud auditor 608 may be able to perform an independent review of certain cloud services to provide details on security, privacy, and/or efficiency compliance with certain exemplary standards.

A cloud broker 604 may be used to facilitate communication between a cloud consumer 606 and various cloud providers 600. In particular, cloud brokers may provide enhancements on top of the services provided by cloud providers 600. In certain instances, cloud brokers may aggregate cloud provider services so that a cloud consumer only needs to contact one cloud service (e.g., the broker) to achieve a service. Cloud brokers may also act as an intermediary to provide "advice" to cloud consumers. For example, a cloud consumer may want a particular type of service but may not know where to go to get the service. Thus, a cloud broker can direct the consumer to a provider.

A cloud carrier 602 provides communication capability between the various cloud services and allows, for example, cloud consumers 606 to communicate with cloud providers 600.

In certain example embodiments, a user's computing device, such as, for example, a typical personal computer, laptop, tablet, or mobile smart phone may be regarded as a Cloud Consumer 606 of the Cloud Providers 600 (e.g., a document/information storage service, an Identity Service, or a Temporal Existence Service). In certain instances, if the Cloud Providers 600 do not meet the standards as established in the NIST model then their services may not be expected to achieve the expected service "up-time", security, privacy, and audited proofs which reflect an expected quality of the cloud service. The Cloud Consumer 606 must be able to expect adherence to this model in order to be able to demonstrate juridical acceptance of a consumer's digital signature that is qualified according to certain example embodiments. Accordingly, cloud auditors may function to ensure compliance with certain techniques and processes set forth herein.

Tables of Identity Structures

In certain example embodiments, the identity of X may be managed during the generation of a digital signature. The following are illustrative techniques for managing the infrastructure of an Identity of X. It will be appreciated, however, that other techniques or methods of maintaining or managing a user's identity may be implemented according to certain example embodiments.

Structured Record of an Identity of X

FIG. 7 is a Structured Record of an Identity U and includes a structured layout of an Identity of John Q Public. This may be one of several means of representing an Identity X. In this case the tags of Identity X are implicit.

The data may be managed as a data processing record 700. The record may be comprised of an ordered set of elements called fields. The fields may be of a fixed length. The fixed length of a field is determined by a statistically determined maximum length of data to be record in the field.

Here, the data record 700 has four components. The first component is the First name of X 702. The second component is the middle name or initial of X 704. The third component is the last name of X 706. The fourth component is the Identity Service's identity of X 708. Respectively, these components have example values of: John, Quincy, Public, and JQ.Public@ExampleIdentityService.com. In this example implementation, it was assumed that a first name does not exceed 16 characters in length; a middle name also does not exceed 16 characters; a last name does not exceed 32 characters; while the service identity does not exceed 64 characters. Such assumptions produce a structured record length of 128 characters. It will be appreciated that larger or smaller record sizes may used based on application requirements.

However, in certain instances, the above structured characteristics may offer little freedom for change (e.g., because they are fixed). For example, if an identity needs to be re-characterized with additional components, further application design must be performed with great care to plan for change in order to minimize programmatic malfunctions. To this end, certain example embodiments may use an object oriented data representation, such as, for example, one that is based on eXtensible Markup Language (XML) with named tags that provides an Identity of X.

Named Tag Using XML of an Identity of X

XML is a flexible means of creating common information formats for programmatic sharing. Using named tags may function to increase programmatic efficacy of encoded information. Also, as the name implies, XML may offer a simpler system for information management.

FIG. 8 shows a XML example of a named tag structure of an Identity of John Q Public as another means of presenting an Identity X. The table in FIG. 8 reflects a definition of an identity X that may be more flexible than that offered by FIG. 7. Accordingly, this form of Identity X may be a flexible, well-established, standardized object model for data management.

As can be seen upon review of the table in FIG. 8, the Named Tag Identity X Using XML may lead one to expect that an identity includes a Full_Name followed by Address followed by Service followed by User_Service_Identity. However, such may not necessarily be the case. Specifically, the above named tags may be order independent and still produce equivalent identities. In other words, as long as the values associated with the named tags are the same then the order of the tags is immaterial. Such is the case since the Document Object Model defined for accessing and manipulating an XML statement is uniquely defined regardless of the order of the XML named tags.

It should be noted that XML named tags can possess tagged sub-components. For example, the Full-Name component possesses sub-components First_Name, Middle_Name, and Last_Name. Further, the values associated with each of the named tags may not be constrained by length. Furthermore, it is straight forward to add enhancements to the structure without greatly affecting the programmatic usage of an identity. The addition of a Salutation to the Full_Name is simple without the necessity of adding Salutation to all XML named tag Identity of X. Finally, the named tags offer a useful and simple readability to any Identity of X.

In certain example embodiments, a cryptographically secure message digest or hashing method may produce a cryptographic binding. In certain instances, a compound message digest including one or more encoded secure message digest or hashing methods may produce a cryptographic binding. In certain example embodiments, cryptographically binding one or more cryptographic bindings may produce a cryptographic binding. In certain example embodiments, a digital witness certificate is retrievable, well-defined evidence of an occurrence of a digital event and is provided by a digital witness service.

In certain example embodiments, a temporal existence certificate service may be a digital witness service. In certain example embodiments, an Identity X is a set of values each of which have explicit or implicit tags used to delineate the definition of a digital identity. In certain example embodiments, an authentic digital identity may be an Identity X which is defined (e.g., uniquely) and associated with an Identity Service. In certain example embodiments, an Identity Service is a computing service (e.g., that may be a cloud service), that manages digital identities, unique to the Identity Service, and potentially authenticates digital identities for use in other services.

As discussed above, various services (e.g., the identity service) may be used to facilitate the provision of a digital signature according to certain example embodiments. Further, users may operate computing resources (e.g., a personal computer or smartphone). Such services and resources may be associated with or run on computer hardware systems.

Figure 9:
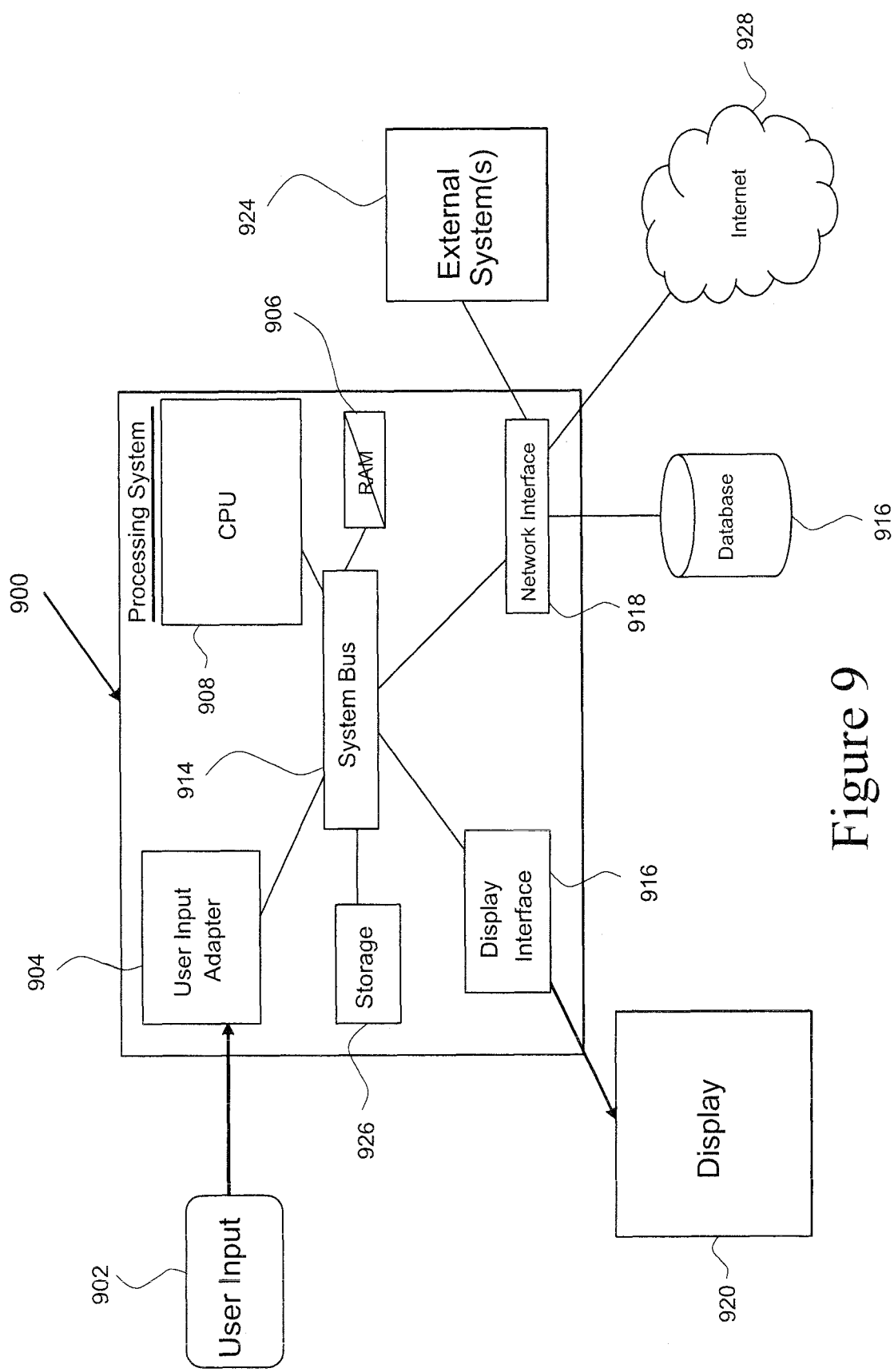
FIG. 9 shows an exemplary computing system according to certain example embodiments.

FIG. 9 shows an exemplary computing system according to certain example embodiments. Techniques described herein (e.g., processes, methods, etc) may be implemented in conjunction with certain example hardware systems, such as processing system 900. The processing system 900 may include a central processing unit 908 (e.g., for generating a message digest or executing a hash against a digital identity) that may communicate via a system bus 914 with storage medium 926, a display interface 916 (e.g., a video card or the like), a network interface 918, random access memory 906, and/or a user input adapter 904. Further, the user input adapter 904 may be coupled to a user input device 902 (e.g., a mouse, keyboard, touchpad, touch screen display, etc). The display interface 916 may be coupled to a display 920. The display may be a television, a standard computer monitor, an LCD display on a mobile phone, or any other type of display device.

The network interface 918 may include functionality for communicating via a wired connection (e.g., Ethernet) or a wireless connection (e.g., cellular technology such as 3G and/or 4G standards, wifi standards such as 802.11x variants, and the like). The network interface 918 may communicate with a database 916 (e.g., that may store contract information that includes signed documents), other external system 924 that may be on an internal network or may be external located (e.g., another cloud based system). Further, the network interface may allow the processing system 900 to communicate over the "Internet" 928 with other systems (e.g., such as a temporal existence service).

It will be appreciated that the architecture shown in FIG. 9 is given only by way of example and that other architectures may be employed to implement various features and techniques as described herein. Such systems may also be used to implement services in a cloud based service (e.g., an identity service) or may be used to implement services on a user system (e.g., a mobile computing device).

In certain example embodiments, the processing system 900 may be a distributed processing system such that processes carries out by the processing system are on separate physical apparatuses (e.g., servers). For example, the processing system 900 may be structured to carry out the processing of both an identity service as described herein and a temporal existence service as described herein (e.g., as shown in FIG. 2). In certain example embodiments, an identity service may have a first processing system (e.g., based on processing system 900) and a temporal existence service may have a second processing system that implements processes and/or methods described herein. Accordingly, various architectural setups are contemplated to implement the techniques described herein.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations (e.g., volatile or non-volatile memory), solid state drives, CD-ROMs, DVDs, tape backups, storage area network (SAN) systems, and/or any other appropriate tangible computer readable storage medium. It also will be appreciated that the techniques described herein may be accomplished by having at least one processor execute instructions that may be tangibly stored on a computer readable storage medium (e.g., RAM, registers, cache, etc).

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

What is claimed is:

1. A method for generating a cryptographically secure digital signature via a processing system of an identity service, the processing system including at least one processor, the cryptographically secure digital signature being associated with a user or a user account of a remote computing resource, the method comprising:

receiving, via a receiver of the identity service, an explicit cryptographic binding from the remote computing resource, the explicit cryptographic binding based on binding an authentic digital identity of the user or the user account to the document or information;

receiving the authentic digital identity;

authenticating the user or a user account as a client to an identity service;

requesting, via the processing system, authentication of the Identity Service to act as an authentic identity service for the generation of the cryptographically secure digital signature from an authorization service;

obtaining a digital witness certification in accordance with the identity service being authorized to act as an identity service, the obtained digital witness certification being based on the explicit cryptographic binding;

producing, via the processing system, a digital signature by combining the digital witness certification, the explicit cryptographic binding, and the authentic digital identity; and sending the produced digital signature back to the remote computing resource, the authentication of the user or the user account as the client of the identity service is based on the authentic digital identity, the authorization service is a secure time-stamp service, the digital witness certification is obtained from the secure time-stamp service, the digital witness certification includes a secure time-stamp certification, and the produced digital signature is classified as a Signed by User Associated with Authenticated Digital Identity certification.

2. A method for generating a cryptographically secure digital signature via a processing system of an identity service, the processing system including at least one processor, the cryptographically secure digital signature being associated with a user or a user account of a remote computing resource, the method comprising:

receiving, via a receiver of the identity service, an explicit cryptographic binding from the remote computing resources, the explicit cryptographic binding based on binding an authentic digital identity of the user or the user account to the document or information;

receiving the authentic digital identity;

authenticating the user or a user account as a client to an identity service;

requesting, via the processing system, authentication of the Identity Service to act as an authentic identity service for the generation of the cryptographically secure digital signature from an authorization service;

obtaining a digital witness certification in accordance with the identity service being authorized to act as an identity service, the obtained digital witness certification being based on the explicit cryptographic binding;

producing, via the processing system, a digital signature by combining the digital witness certification, the explicit cryptographic binding, and the authentic digital identity;

sending the produced digital signature back to the remote computing resource;

generating, via the processing system, a further cryptographic binding via a cryptographic process that is based on the produced digital signature and a stored digital identity of the identity service;

obtaining a temporal certificate from the secure-time stamp service, the temporal certificate being based on the generated further cryptographic binding, the temporal certificate including a secure-time stamp;

generate a notarized result based at least in part on the generated further cryptographic binding, the obtained temporal certificate, and produced digital signature; and return, via the transceiver, the generated notarized result to the remote computing resource, wherein the authorization service is a secure time-stamp service.

3. A system for creating a digital signature associated with a digital element that is a document and/or information, the system comprising:

a first computing service for providing digital signature functionality to at least one user, the first computing service comprising:

a transceiver configured to communicate with at least a remote computing resource that is associated with a user or user account; and a processing system that is coupled to the transceiver interface, the processing system including at least one processor, the processing system configured to:

receive, via the transceiver, a digital authentication request from the remote computing resource, the digital authentication request including a requesting identity;

authenticate the digital authentication request by authenticating the requesting identity as an authentic client;

receive, via the transceiver, a cryptographic binding from the remote computer resource, the cryptographic binding based on a digital identity of the user or the user account and the digital element;

receive, via the transceiver, the digital identity, the received digital identity is a registered digital identity that is registered with the system, where the first computing service further comprises a storage medium configured to store a corresponding digital identity that corresponds to the received digital identity;

request authentication, via a digital authentication service, for the first computing service to act as an authenticate service for providing the digital signature;

obtain a digital witness certification, the digital witness certification being based on the received cryptographic binding;

generate a digital signature based at least in part on the received cryptographic binding, the digital witness certification, and the received digital identity;

return, via the transceiver, the generated digital signature to the remote computing resource; and receive a secure authentication tag from the remote computing resource, the secure authentication tag previously obtained by the remote computing resource from a temporal existence service, the requesting identity and the digital identity are the same identity, the obtained digital witness certification is obtained via a request to the temporal existence service, the request including at least the received secure authentication tag and the cryptographic binding.

4. The system of claim 3, wherein the digital witness certification includes a secure time-stamp that is determined by the temporal existence service based on the cryptographic binding.

5. The system of claim 3, wherein the digital element is not sent from the remote computing resource to the first computing service.

6. A system for creating a digital signature associated with a digital element that is a document and/or information, the system comprising:

a first computing service for providing digital signature functionality to at least one user, the first computing service comprising:

a transceiver configured to communicate with at least a remote computing resource associated with a user or user account;

a storage medium configured to store a digital identity of the first computing service; and a processing system coupled to the transceiver interface, the processing system including at least one processor, the processing system configured to:

receive, via the transceiver, a digital authentication request from the remote computing resource, the digital authentication request including a requesting identity;

authenticate the digital authentication request by authenticating the requesting identity as an authentic client;
receive, via the transceiver, a cryptographic binding from the remote computer resource, the cryptographic binding based on a digital identity of the user or the user account and the digital element;
receive, via the transceiver, the digital identity, the received digital identity is a registered digital identity that is registered with the system, where the storage medium is further configured to store a corresponding digital identity that corresponds to the received digital identity;
request authentication, via a digital authentication service, for the first computing service to act as an authenticate service for providing the digital signature;
obtain a digital witness certification, the digital witness certification being based on the received cryptographic binding;
generate a digital signature based at least in part on the received cryptograpic binding, the digital witness certification, and the received digital identity,
return, via the transceiver, the generated digital signature to the remote computing resource;
generate, via a cryptographic process, a binding that is based on the generated digital signature and the stored digital identity of the first computing service;
obtain a temporal certificate from a temporal existence service, the temporal certificate being based on the generated binding;
generate a notarized digital signature based at least in part on the generated binding, the obtained temporal certificate, and generated digital signature; and
return, via the transceiver, the generated notarized digital signature to the remote computing resource,
the requesting identity and the digital identity are the same identity,
wherein the digital authentication service is the temporal existence service.

7. The system of claim 6, wherein the processing system of the first computing service is further configured to:
receive a secure authentication tag from the remote computing resource, the secure authentication tag previously obtained by the remote computing resource from the temporal existence service,
wherein the obtained digital witness certification is obtained via a request to the temporal existence service, the request including at least the received secure authentication tag and the cryptographic binding.

8. The system of claim 6, wherein the digital identity is a registered digital identity that is registered with the first computing service, the registered digital identity being based on another cryptographic binding of an identity and a digital document.

9. A system for creating a digital signature associated with a digital element that is a document and/or information, the system comprising:
a digital authentication service, the digital authentication service including a processing system comprising at least one processor; and
a first computing service for providing digital signature functionality to at least one user, the first computing service comprising:
a transceiver configured to communicate with at least a remote computing resource that is associated with a user or user account; and
a processing system that is coupled to the transceiver interface, the processing system including at least one processor, the processing system configured to:
receive, via the transceiver, a digital authentication request from the remote computing resource, the digital authentication request including a requesting identity;
receive, via the transceiver, the digital identity,
authenticate the digital authentication request by authenticating the requesting identity as an authentic client;
receive, via the transceiver, a cryptographic binding from the remote computer resource, the cryptographic binding based on a digital identity of the user or the user account and the digital element;
request authentication, via a digital authentication service, for the first computing service to act as an authenticate service for providing the digital signature;
obtain a digital witness certification, the digital witness certification being based on the received cryptographic binding;
generate a digital signature based at least in part on the received cryptographic binding, the digital witness certification, and the received digital identity; and
return, via the transceiver, the generated digital signature to the remote computing resource,
the processing system of the digital authentication service configured to:
receive the request for authentication from the first computing service;
authorize the first computing service to act as the authenticate service based at least in part on a condition;
receive the cryptographic binding from the first computing service;
generate the digital witness certification based on the cryptographic binding;
send the generated the digital witness certification to the first computing service;
receive a temporal identifier request from the remote computing resource;
responsive to the request, generate a temporal identifier;
return, prior to reception of the digital authentication request, the temporal identifier to the remote computing resource; and
receive, from the first computing service, the generated temporal identifier which had been sent to the first computing service from the remote computing resource,
wherein the at least one condition is based on the received generated temporal identifier,
wherein the digital authentication service is a temporal existence certificate service.

10. The system of claim 9, wherein generation of the digital witness certification based on the cryptographic binding includes generation of a secure time-stamp based on the cryptographic binding.

* * * * *